United States Patent [19]

Kammerer

[11] 3,960,117

[45] June 1, 1976

[54] ROTARY ENGINE

[76] Inventor: Edwin G. Kammerer, 7913 Wharton Ave., Lamont, Calif. 93241

[22] Filed: July 10, 1974

[21] Appl. No.: 487,318

[52] U.S. Cl. .............................. 123/8.49; 418/187
[51] Int. Cl.² ......................................... F02B 53/00
[58] Field of Search ............... 123/8.49, 25 C, 25 P; 60/39.55, 39.61; 418/186, 187, 188

[56] References Cited
UNITED STATES PATENTS

| | | | |
|---|---|---|---|
| 868,374 | 10/1907 | Thomure | 418/186 X |
| 1,145,161 | 7/1915 | Mears | 123/8.49 X |
| 1,192,665 | 7/1916 | Mears | 60/39.61 |
| 2,140,085 | 12/1938 | Maina | 60/39.63 X |
| 2,507,151 | 5/1950 | Gabriel | 418/186 X |
| 2,656,677 | 10/1953 | Peterson | 60/39.55 X |
| 3,254,489 | 6/1966 | Eickmann | 60/39.61 |
| 3,314,368 | 4/1967 | Drutchas et al. | 418/188 |
| 3,461,974 | 8/1969 | Bartos | 418/186 X |
| 3,539,280 | 11/1970 | Ravera | 418/186 X |

FOREIGN PATENTS OR APPLICATIONS 144,248  1/1936  Austria ........................ 123/8.13

*Primary Examiner*—Carlton R. Croyle
*Assistant Examiner*—Michael Koczo, Jr.
*Attorney, Agent, or Firm*—Paul A. Weilein

[57] ABSTRACT

A rotor has two opposite lobes which cooperate with the inner surface of a cylindrical wall and further cooperate with four equally spaced retractible radial vanes to form successive pairs of diametrically opposite expanding chambers and successive pairs of diametrically opposite contracting chambers. The pairs of diametrically opposite chambers progress step by step in the direction of rotation of the rotor. Actuating fluid is supplied continuously to the expanding chambers from space inside the rotor through ports on the trailing sides of the two lobes of the rotor and the contracting chambers are continuously exhausted to an exhaust space inside the rotor through exhaust passages from the leading sides of the two lobes.

3 Claims, 8 Drawing Figures

ROTARY ENGINE

BACKGROUND OF THE INVENTION

Broadly described, the invention relates to the type of rotary engine in which a rotor has a plurality of radial lobes that traverse the inner surface of a cylindrical wall and cooperate with a plurality of retractible vanes in the cylindrical wall to form expanding and contracting chambers. Rotary engines of this general type are disclosed, for example, in the Mears U.S. Pat. No. 1,192,665, the Thomas U.S. Pat. No. 1,952,149 and in the German Pat. issued to Weber, No. 386,356. The engines of the these prior disclosures are unduly complicated, however, and therefore costly to manufacture and expensive to maintain. The present invention is directed to the need for a simple but highly efficient rotary engine of this general type.

SUMMARY OF THE INVENTION

One object of the invention is to provide an uncomplicated, highly efficient rotary engine of simple structure with minimum moving parts. To achieve this object a rotor has two diametrically opposite lobes that traverse an inner cylindrical wall of a stator casing and the stator casing is provided with four equally circumferentially spaced retractible vanes. Cooperating with the retractible vanes, the two rotor lobes form successive expanding power chambers and successive contracting exhaust chambers. Actuating fluid is supplied continuously to the expanding power chambers through ports on the trailing sides of the two lobes and spent gases from the contracting chambers are exhausted through ports on the leading sides of the two lobes.

A feature of the invention is the concept of simplifying the engine construction by employing the interior of the rotor not only to supply actuating fluid to the expanding chambers, but also to exhaust spent fluid from the contracting chambers. For this purpose a stationary axial tube forms an ignition and combustion chamber that is in continuous communication with an axial compartment of the rotor and this axial compartment is connected by opposite radial tubes to the ports on the trailing sides of the lobes that supply actuating fluid to the expanding compartments. The rest of the interior of the rotor serves as an exhaust space that is in continuous communication with a plurality of exhaust pipes and the ports on the leading sides of the two lobes communicate with this exhaust space.

A furthr object of the invention is to provide substantially continuous and smooth power output. The attainment of this object is inherent in the described construction whereby the flow of acutating fluid to the expanding chambers is substantially continuous and the venting of the contracting chambers to the atmosphere is substantially continuous.

A further important object of the invention is to employ a water jacket structure for the dual purpose of cooling the engine and of supplying moisture to the combustion chamber for more efficient power generation. For this purpose water circulates through the water jacket structure and is introduced as steam into the ignition and combustion chamber.

Another object of the invention is to provide compressed air for increased efficiency of an internal combustion rotary engine. For this purpose compressed air is mixed with the stream of fuel that is continuously injected into the ignition and combustion chamber.

A still further object of the invention is to provide a rotary engine that may be readily operated as a steam engine or as a compressed air motor or as a hydraulic motor.

The various objects and advantages of the invention will be apparent from the following detailed description and the accompanying drawings.

BRIEF DESCRIPTION OF THE DRAWINGS

In the drawings, which are to be regarded as merely illustrative.

DESCRIPTION OF THE PREFERRED EMBODIMENT OF THE INVENTION

Figure 1:
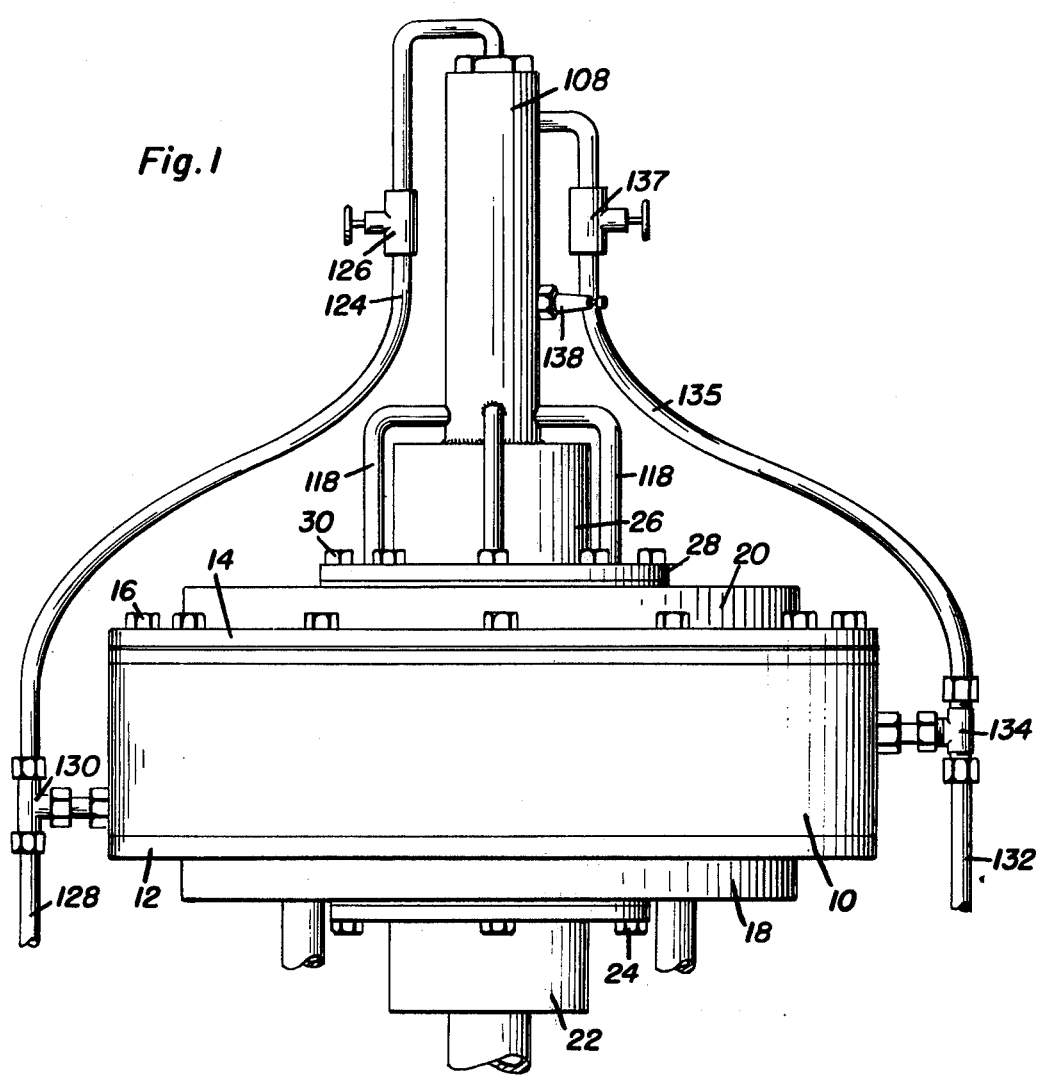
FIG. 1 is a side elevational view of an internal combustion engine incorporating the principles of the invention.

Referring now to the accompanying drawings, wherein like numerals designate similar parts throughout the various views, the internal combustion engine includes a cylindrical stator or casing 10 which is provided with a bottom closure wall 12 and a removable top wall 14 secured thereto by bolts 16.

A pair of water jackets 18 and 20 are secured to the walls 12 and 14. Depending from the lower water jacket 18 is a packing box 22 secured to the water jacket as by bolts 24. A similar packing box 26 is welded or otherwise fixedly secured to a plate-like flange 28 which is fastened by bolts 30 to the upper water jacket 20.

Figure 7:
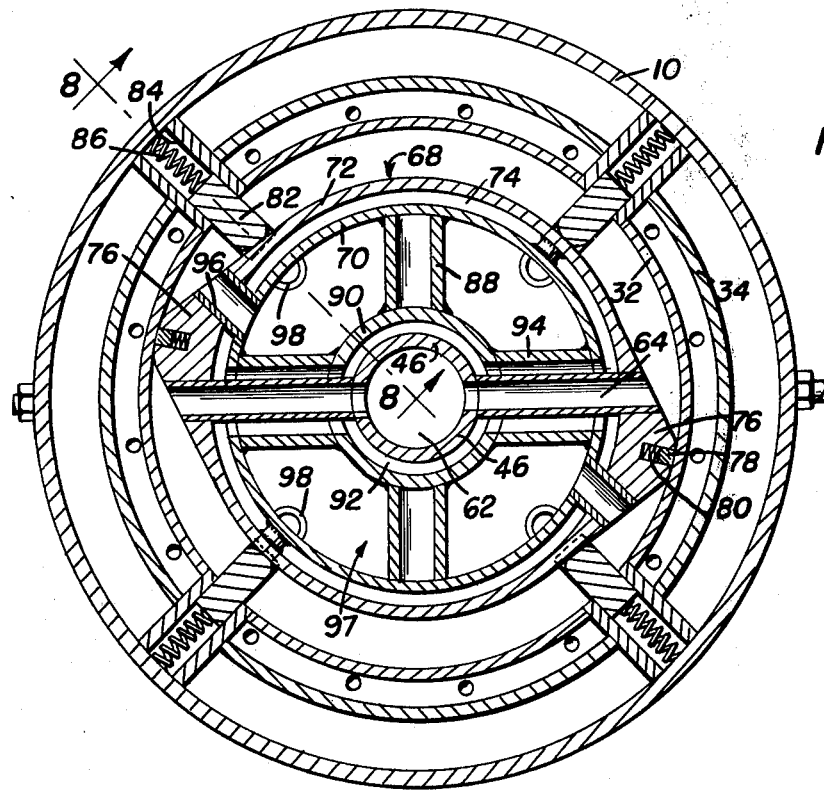
FIG. 7 is a transverse sectional view taken as indicated by the line 7—7 of FIG. 3, showing certain details of the working chambers and the fluid passage systems.
Figure 3:
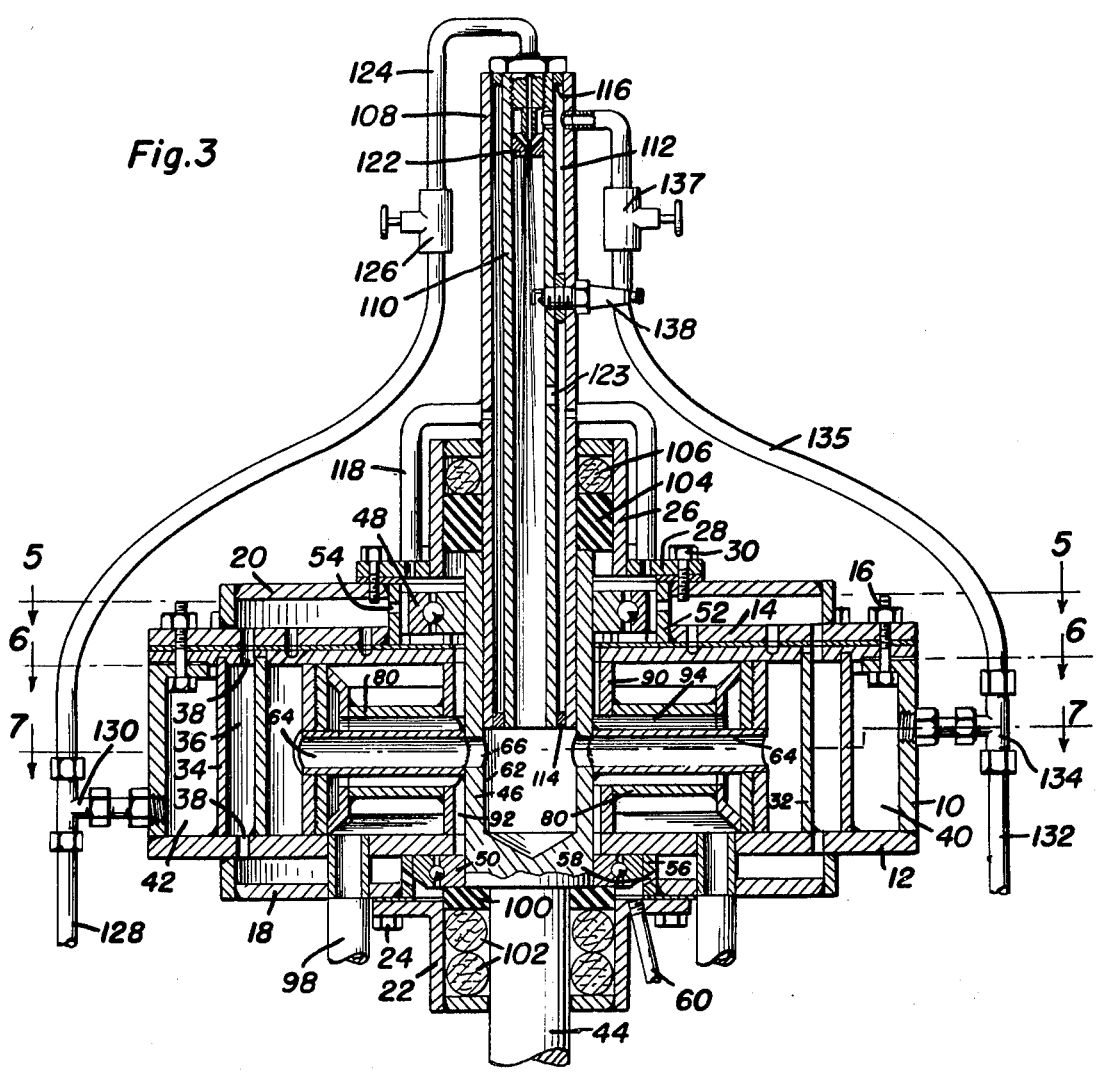
FIG. 3 is an axial sectional view taken as indicated by the line 3—3 of FIG. 2.
Figure 6:
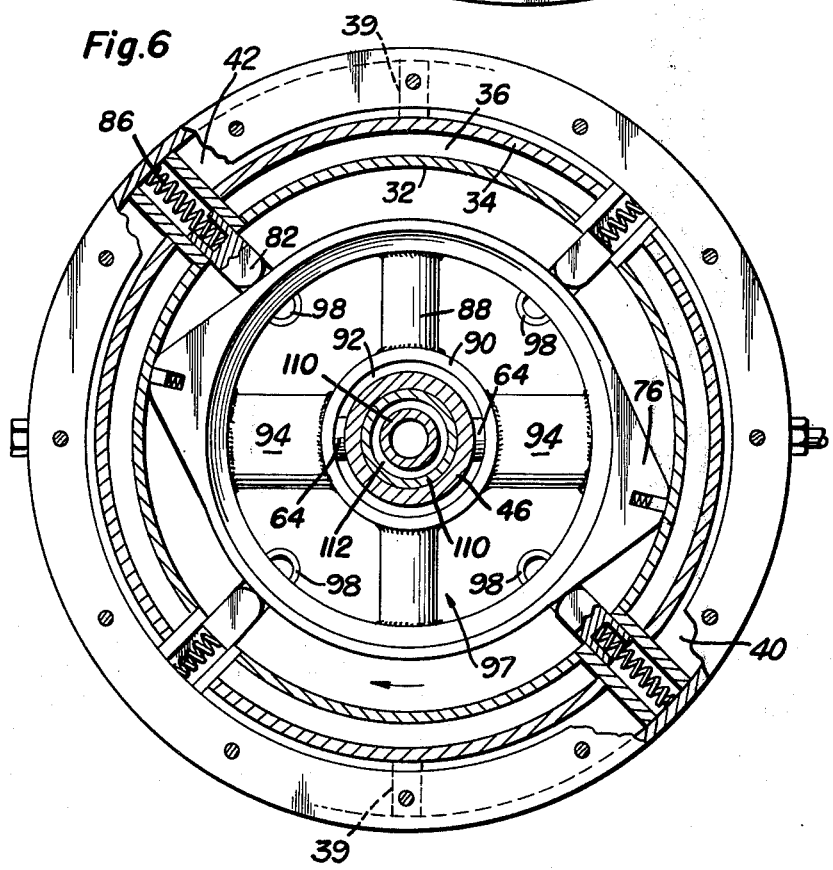
FIG. 6 is a transverse sectional view taken as indicated by the line 6—6 of FIG. 3.

Referring now particularly to FIGS. 3, 6 and 7, the stator or casing 10 is provided with an inner cylindrical wall 32. Surrounding the cylindrical wall 32 is a second, concentric cylindrical wall 34, and the space between the walls 32 and 34 constitutes an annular water jacket. The annular water jacket, indicated by the numeral 36, is in communication with the upper and lower water jackets 20 and 18, respectively, by water passages 38. The annular space in the casing between the second cylindrical wall 34 and the outer cylindrical wall of the casing is diametrically divided by radial walls 39 (FIG. 6) to provide a pair of semi-cylindrical air and fuel reservoirs 40 and 42, respectively.

A power or drive shaft 44 is disposed centrally and vertically of the casing 10, and has a hollow enlarged portion 46 journalled in the stator casing by upper and lower bearing assemblies 48 and 50.

Figure 8:
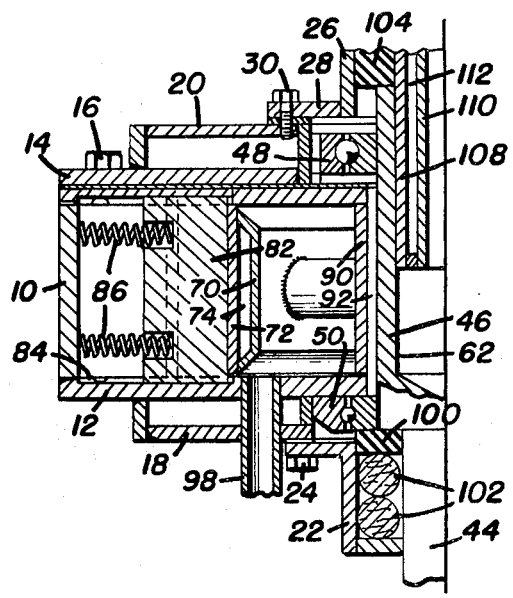
FIG. 8 is a fragmentary sectional view taken as indicated by the line 8—8 of FIG. 7.
Figure 5:
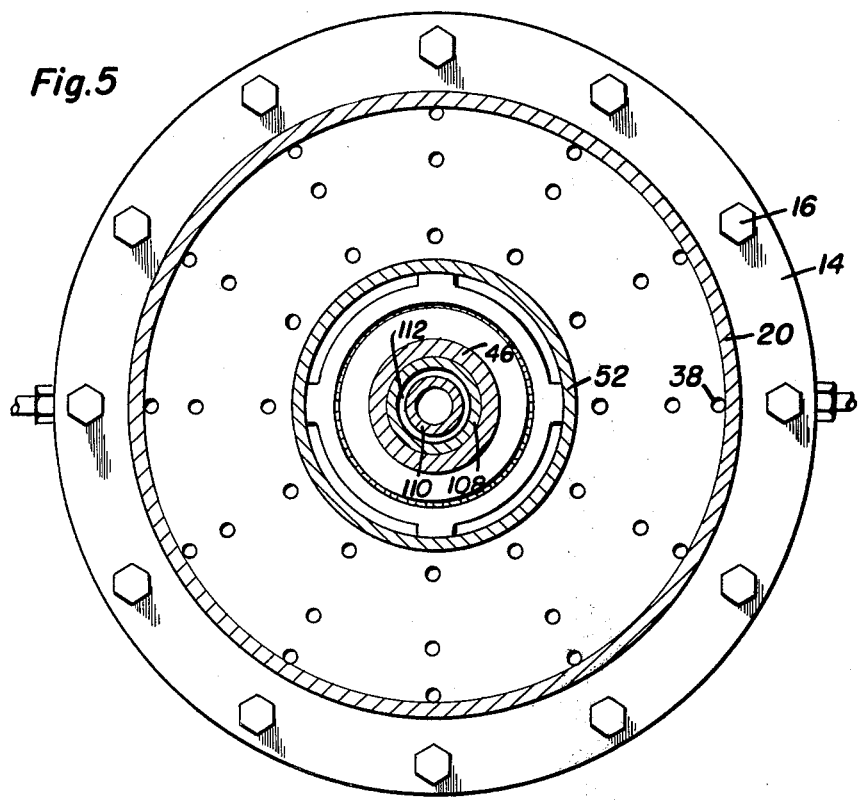
FIG. 5 is a transverse sectional view taken as indicated by the line 5—5 of FIG. 3.

As shown in FIGS. 3 and 8, the upper bearing 48 is mounted in a bearing chamber consisting of a cylindrical wall 52 which is disposed between the members 20 and 14, the lower end of the cylindrical wall 52 being received in and welded to a central aperture in the wall 14 as illustrated. This cylindrical wall 52 is, in turn, provided with water ports 54 which establish communication between the upper water jacket 20 and the interior of the upper bearing compartment.

In a similar manner, the lower bearing 50 is received in a bearing compartment defined by a cylindrical side wall 56 which is secured between the members 12 and 18, the lower end of the side wall 56 being received within an axial aperture in the wall 18 and being welded thereto. Water circulating bores 58 extend through the cylindrical wall 56 and establish communication between the lower bearing chamber and the lower water jacket 18. If desired, the ports 54, 58 could be omitted whereby the bearing comparments within the walls 52, 56 would be sealed from the water jacket, suitable bearing lubricating means being provided.

By means of a conduit 60 which communicates with the interior of the lower bearing compartment, water or other coolant from any desired source may be supplied to the lower bearing compartment and circulated through the lower water jacket 18, thence by means of the ports 38 to the stator water jacket 36, thence by ports 38 to the upper water jacekt 20, and from thence by ports 54 to the upper bearing compartment.

The shaft 44 is journalled in both of the upper and lower side walls of the stator, and the above mentioned enlarged tubular portion 46 of the drive shaft has a cylindrical bore forming an axial compartment 62.

A pair of radially disposed tubes 64 for delivering the actuating fluid under pressure to the working or expanding chambers of the engine are welded or otherwise rigidly secured to the enlarged portion 46 and communicate with apertures 66 which open into the chamber 62 within the shaft. The tubes 64 extend through and form part of a rotor that is indicated generally by the numeral 68 and, as best shown in FIG. 7, has concentric inner and outer spaced cylindrical walls 70 and 72 providing an annular water jacket 74 therebetween.

The rotor 68 rotates within the space defined by the inner cylindrical wall 32 and is unitary with the shaft 44 to constitute therewith a rotary assembly. The rotor 68 is formed with a pair of diametrically opposite lobes 76, each of which is provided with a packing strip 78 that is resiliently urged by a spring 80 from a radial slot 81 into resilient sealing engagement with the inner circumference of the inner cylindrical wall 32.

A set of four equally spaced radial, slidable vanes 82 extend through guiding channels 84 disposed radially through the inner cylindrical wall 32, and are yieldingly urged as by springs 86 into yielding pressure contact with the periphery of the rotor 68. The sliding vanes 82 and the lobes 76 of the rotor 68 cooperate with each other during rotation of the piston and for this purpose each of the lobes is formed with opposite sloping shoulders.

The rotor structure further includes a pair of diametrically opposite radial bracking tubes or tubular spokes 88 which at their outer ends are welded to the wall 70 of the rotor and at their inner ends are welded to a cylindrical hub 90 of the rotor, this hub surrounding the enlarged portion 46 of the shaft in spaced relation thereto to define an annular water passage 92 therebetween. A pair of radial tubes 94 likewise surround the previously mentioned pair of radial tubes 64 in spaced relation thereto, thus defining radially extending water passages connecting the water chamber 92 with the water jacket 74 previously mentioned. The water jacekt 74 is also in continuous communication with the upper and lower bearing compartments as illustrated in FIG. 3.

The pair of diametrically opposite tubes 64 establish communication between the axial compartment 62 in the rotor and the periphery of the rotor and thus establish communication with expanding chambers that are formed in sequence by the two rotor lobes 76 and the four cooperating radial vanes 82. It is to be noted that the rotor rotates clockwise as viewed in FIG. 7 and that the tubes 64 terminate on the trailing sides of the two lobes and therefore communicate with expanding chambers as the chambers are formed successively by the lobes and the radial vanes.

In a manner set forth hereinafter, a continuous combustible charge is ignited and applies its force continuously through the two tubes 64 to the expanding chambers to cause rotation of the rotor and of the shaft. Exhaust or combustion products are educted from successive contracting chambers by means of passges 96 on the leading sides of the rotor lobes 76 which extend through the rotor walls 70 and 72 and establish communication between the expanding chambers and a large exhaust compartment 97 which surrounds the tubes 88 and 94 inside the rotor.

The exhaust products are discharged or vented to the atmosphere from the exhaust compartment 97 by means of four exhaust pipes 98 which, as shown in FIG. 3, extend through the lower water jackets 18. It can be seen in FIG. 6 that the exhaust compartment 97 is continuously in communication with the inner ends of the four exhaust pipes 98.

The lower packing box 22 is provided with an upper resilient sealing plate 100 of any suitable material, having annular packing rings 102 bearing thereagainst. The plate 100 prevents the cooling medium from escaping from the lower bearing box downwardly along the shaft 44.

The upper packing box 26 is provided with a somewhat similar construction including a resilient packing block or plate 104 which bears against the upper end of the tubular enlargement 46 of the shaft 44, and which is engaged by an annular packing ring 106. This packing member serves to prevent the upward escape of cooling medium from the upper bearing compartment.

As shown in FIG. 3, stationary tube 108 disposed axially of the power shaft has a rotary sliding fit in the open upper end of the axial compartment 62 of the rotor that is formed in the tubular enlargement 46 of the shaft. This tube extends through the packing members 104, 106 and through the upper packing box 26.

A stationary concentric sleeve 110 is disposed within the stationary tube 108, thus defining an annular jacket 112 therebetween. This jacket is sealed at the lower and upper ends by closure rings 114 and 116. This annular jacket constitutes a water jacekt for the inner sleeve 110, the latter constituting a continuously operating combustion and firing chamber for the engine.

The water jacket 112 is in communication with the interior of the upper bearing compartment by means of conduits 118.

Figure 4:
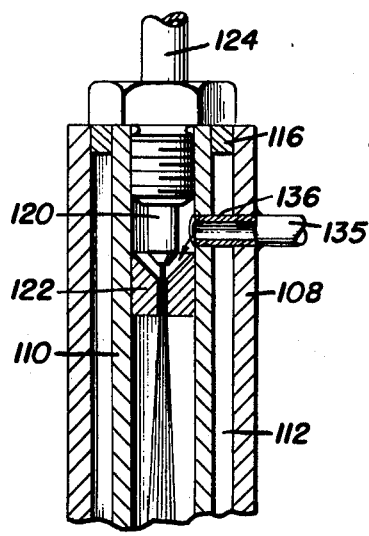
FIG. 4 is an enlarged portion of FIG. 3.
Figure 2:
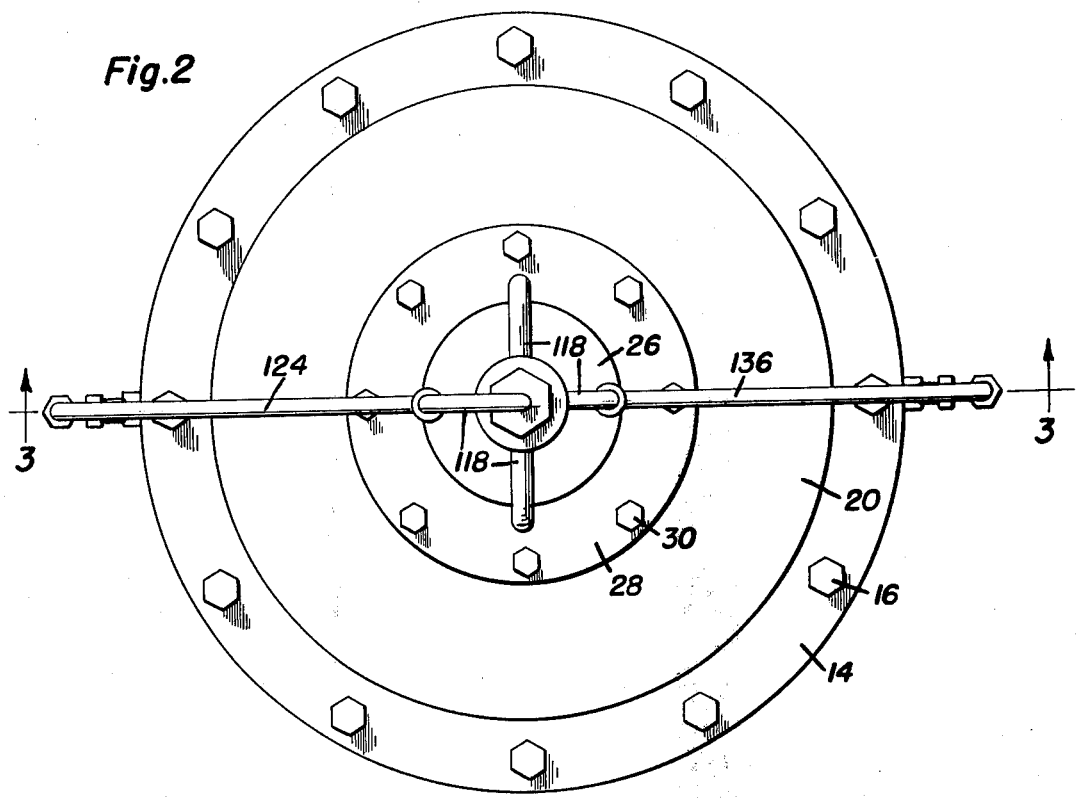
FIG. 2 is a top plan view of the engine of FIG. 1.

Referring now more specifically to FIG. 4, a fuel injection nozzle 120 is screw threadedly engaged in the upper end of the sleeve 110 and closes the same, this nozzle terminating in closely spaced relation to a nozzle metering orifice member 122 which is disposed within the sleeve 110. A fuel supply conduit 124 communicates with the nozzles 120 and supplies fuel, under the control of a manually controlled valve 126 to the fuel nozzle. Fuel from any suitable source under pressure in a conduit 128 is supplied by means of a T-coupling 130 to the conduit 124 as well as to the previously mentioned fuel storage tank 42 in the casing 10.

Compressed air from any suitable source is supplied by a conduit 132 to a T-coupling 134 which communicates with the air storage compartment 40 of the casing 10 and with a conduit 135, having a conduit valve 137, which extends into the side of the stationary tube 108 adjacent the upper end of the same as shown in FIG. 4. A nozzle bushing 136 extends through the sleeve 110 in axial alignment with the end of the conduit 135, in a position above the metering orifice member 122. The compressed air thus is discharged from the outlet of the tube 135 across the jacket 112 and into the air injection nozzle 136. Steam generated by the water jacket of the engine rises in the jacket 112 and is inducted or aspirated by the aspirating nozzle shown in FIG. 4 through a port 123 in the sleeve 110 into the combustion chamber below the metering orifice member 122 where the steam mingles with the fuel mixture.

It is within the scope of this invention to provide means for selectively shutting off the supply of air and steam into the combustion chamber, if desired.

Ignition of the combustible mixture, with or without the steam component, is effected by suitable means 138 which may be an electric spark plug or a conventional glow plug, energized by any suitable source.

It is apparent that the ignition chamber formed by the inner sleeve 110 has a water jacket and this water jacket forms a part of the water cooling system of the entire engine.

As willl now be readily understood, the continuous supply of fuel, air and steam that is admitted to the interior of the sleeve 110 of the stationary tube 112, is ignited to maintain continuous combustion within the sleeve and the axial rotor chamber 62, the resultant high pressure gaseous mixture being discharged in sequence during rotation of the rotor through the opposite tubes 64 to oppositely disposed pairs of expanding chambers within the stator casing 10 of the engine. These combustion products expanding against the four vanes 82 and the lobes 76 of the rotor 68, cause rotation of the rotor thereby driving the power shaft. In synchronized automatic sequence the expanding chambers are placed in communication with the exhaust chamber 97 as the passages 96 of the rotor pass the vanes.

FIG. 7 shows a momentary state of the engine in which each of the two lobes 76 of the rotor 68 is spaced between two of the radial vanes 82. With the rotor 68 rotating clockwise, the trailing side of each lobe 76 is a moving wall of an expanding chamber receiving combustion gases through a corresponding radial tube 64 and the leading side of the lobe is a moving wall of a contracting chamber that discharges spent gases through a corresponding passage 96 into the rotor chamber 97 which is vented to the atmosphere by the exhaust pipes 98. At the same time the two upper vanes 82 as viewed in FIG. 7 form what may be termed a neutral chamber that for the moment neither expands nor contracts and in like manner the two lower vanes 82 form a second neutral chamber that for the moment neither expands nor contracts. It is important to note that the forces that act on the rotor 68 are in perfect balance because the two momentarily expanding chambers are diametrically opposite to each other and the momentarily contracting chambers are diametrically opposite to each other.

When the left lobe 76 in FIG. 7 passes the upper left radial vane 82 and the right lobe in FIG. 7 simultaneously passes the lower right lobe 76, each lobe initiates a new expanding chamber and a new contracting chamber. Thus, pairs of diametrically opposite expanding chambers and pairs of diametrically opposite contracting chambers as well as pairs of diametrically opposite neutral chambers progress step by step clockwise with the clockwise rotation of the rotor. It is to be noted, however, that although the chambers shift step by step with the rotation of the rotor, nevertheless the flow of the actuating fluid is substantially continuous into the successive expanding chambers and the flow of the exhaust fluids from the contracting chambers is substantially continuous to the atmosphere. Thus, the engine is characterized by substantially smooth power generation as distinguished from power pulsations created by a conventional piston type engine.

Although the preferred embodiment of the invention incorporates four equally circumferentially spaced radial vanes 82, only two radial vanes may be provided if desired and, on the other hand, more than four of the radial vanes may be provided. There is reason to believe that the optimum number of radial vanes is four.

It will, of course, be apparent that any actuation fluid such as compressed air, steam or pressurized liquid may be employed to drive the engine, in which case the ignition system and the cooling system may not be necessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:
1. In a rotary engine, the combination of:
a casing having an inner cylindrical wall;
a rotor in the casing for power output from the engine,
said rotor having at least one pair of lobes in sliding contact with said inner cylindrical wall, said lobes being formed with opposite sloping shoulders;
a plurality of vanes extending inward from said cylindrical wall in pressure contact with the periphery of the rotor, said vanes being yieldingly urged inwardly to follow the configuration of the lobes,
whereby the trailing sides of the lobes with respect to the direction of rotation of the rotor cooperate with the vanes successively to form successive expanding chambers and the leading sides of the lobes cooperate with the vanes successively to form successive contracting chambers,
said rotor having a central interior chamber for a high pressure actuating fluid and a separate interior chamber for exhaust fluid surrounding said central chamber,
an axial end of said chamber for exhaust fluid communicating with stationary exhaust passage means;
stationary means including a fuel combustion chamber cooperative with the rotor to supply high pressure actuating fluid to the first mentioned central chamber in the rotor;

a first set of tubular passages in the rotor extending from said central chamber, through said separate chamber into communication with the trailing sides of the lobes respectively to deliver the actuating fluid to the successive expanding chambers; and a second set of tubular passages in the rotor extending from said separate chamber into communication with the leading sides of the lobes respectively to exhaust the successive contracting chambers.

2. A rotary engine as defined in claim 1 including inner and outer annular coolant jacket portions, respectively, between said chambers and surrounding said separate chamber, said first tubular passages extending through both said jacket portions, and a larger tube surrounding and spaced from each of said first tubular passages, extending across said second interior chamber and providing a coolant flow path between said inner and outer jacket portions.

3. A rotary engine as defined in claim 1 including means defining a coolant jacket around said fuel combustion chamber and passage means from said jacket into said combustion chamber providing for injection of water into said combustion chamber.

* * * * *

UNITED STATES PATENT OFFICE
CERTIFICATE OF CORRECTION

PATENT NO. : 3,960,117
DATED : June 1, 1976
INVENTOR(S) : Edwin G. Kammerer

It is certified that error appears in the above–identified patent and that said Letters Patent are hereby corrected as shown below:

Column 3, line 58, "bracking" should read --bracing--.

Column 5, line 9, "conduit" (second occurrence) should read --control--.

Signed and Sealed this

Thirty-first Day of August 1976

[SEAL]

Attest:

RUTH C. MASON
Attesting Officer

C. MARSHALL DANN
Commissioner of Patents and Trademarks